United States Patent [19]

Culp

[11] Patent Number: 4,471,218

[45] Date of Patent: Sep. 11, 1984

[54] SELF-CONTAINED, PORTABLE DATA ENTRY TERMINAL

[75] Inventor: David W. Culp, Huntington Beach, Calif.

[73] Assignee: MSI Data Corporation, Costa Mesa, Calif.

[21] Appl. No.: 379,929

[22] Filed: May 19, 1982

[51] Int. Cl.³ .............................................. G06K 7/10
[52] U.S. Cl. .................................... 235/472; 235/462; 235/454
[58] Field of Search ................ 235/381, 472, 454, 462

[56] References Cited

U.S. PATENT DOCUMENTS

| | | | |
|---|---|---|---|
| 3,752,961 | 8/1973 | Torrey | 235/472 |
| 3,826,900 | 7/1974 | Moellering | 235/472 |
| 3,918,029 | 11/1975 | Lemelson | 235/472 |
| 4,120,452 | 10/1978 | Kimura | 235/381 |
| 4,179,064 | 12/1979 | Yoshioka | 235/381 |

Primary Examiner—Harold I. Pitts
Attorney, Agent, or Firm—Spensley Horn Jubas & Lubitz

[57] ABSTRACT

A self-contained, portable data entry terminal positioned within a cordless, wand-type enclosure. Positioned within the enclosure is a bar code optical sensor/emitter, signal conditioning electronics, a microprocessor, a memory, and a rechargable battery. The bar code optical reader functions as both a sensor and an emitter to permit the readout of data stored in the memory.

5 Claims, 6 Drawing Figures

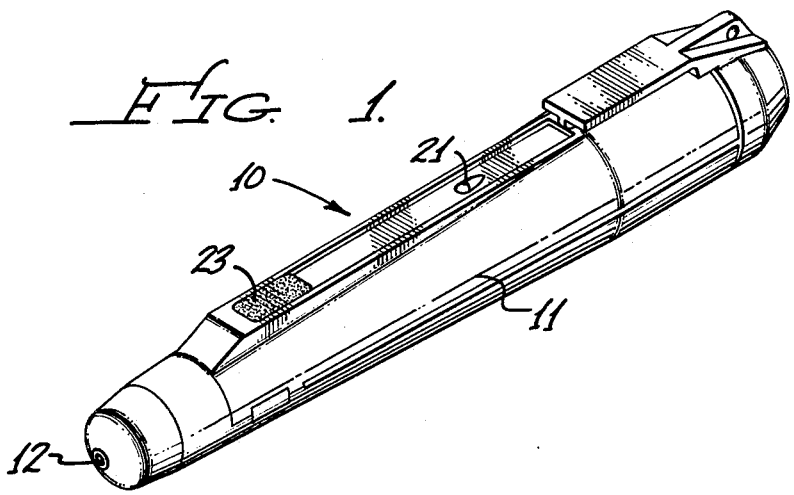
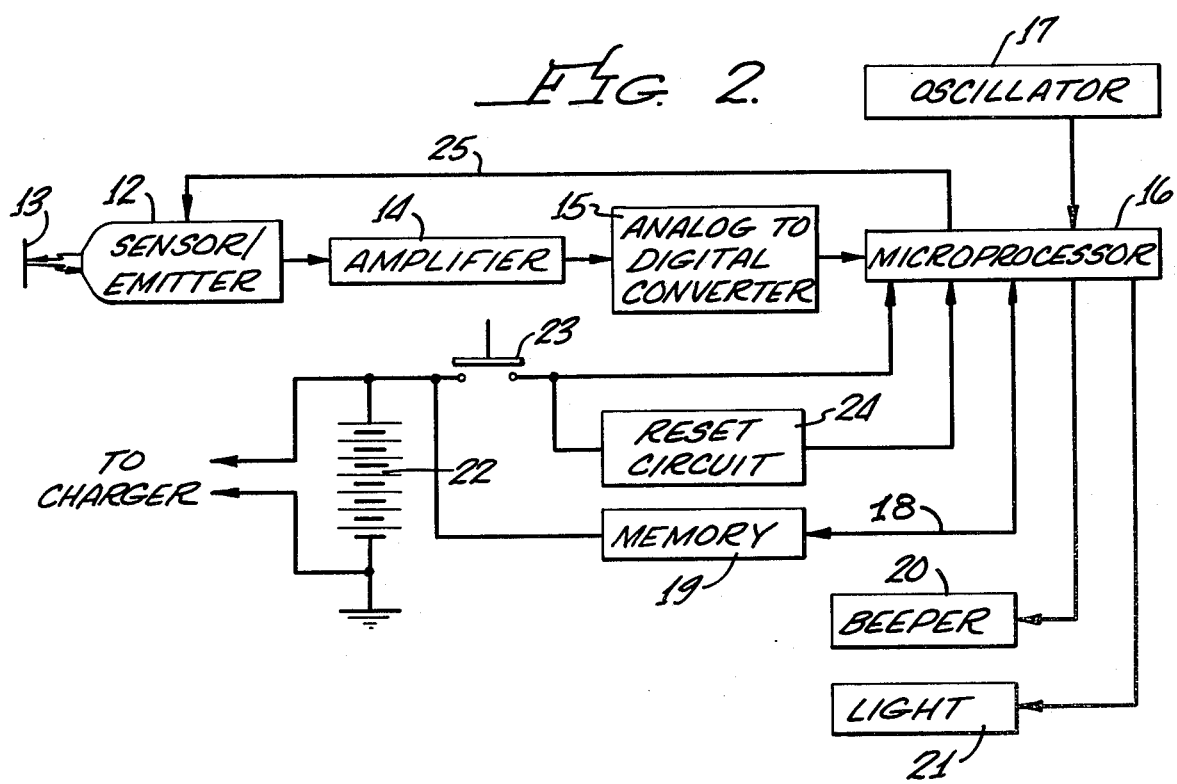
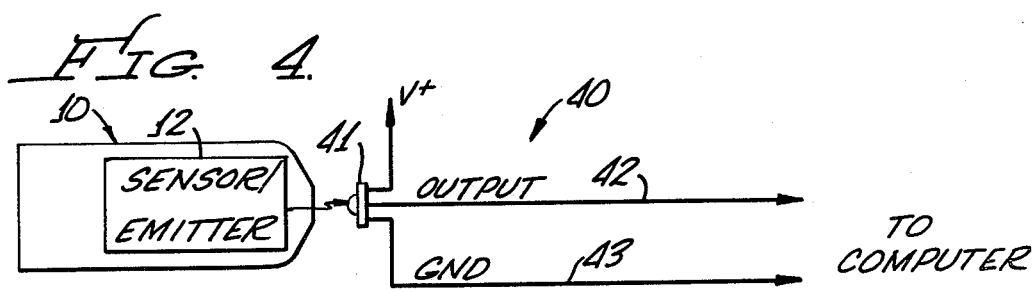

SELF-CONTAINED, PORTABLE DATA ENTRY TERMINAL

BACKGROUND OF THE INVENTION

1. Field of the Invention

The present invention relates to a portable data entry terminal and, more particularly, to a self-contained, portable data entry terminal positioned within a cordless, wand-type enclosure.

2. Description of the Prior Art

The ability of computers to handle large amounts of data has grown dramatically while the cost of computing has decreased significantly, giving business and industry a powerful management tool. Yet, the ability to interface working operations, where the data exists, with computers, where the data is managed, has lagged behind. Most attention has been placed on developing the main frame or central computer and most early applications of computing power resided in scientific laboratories or central business offices where the data to be managed were close at hand.

Management has come to recognize that data that is meaningful to capture is found anywhere, from the supermarket shelf for inventory and the factory floor for work management to a desert pipeline for monitoring. As a result, in an attempt to find new and useful applications for the computer power it has, business is reaching out to the factory and warehouse floor and to remote field operations in order to capture, contain and manage the myriad of important bits of information generated in these locations.

In order to be responsive to this need of business, MSI Data Corporation, the assignee of the present application, has developed a line of portable data entry terminals which record data at its point of origin for subsequent transmission to computers. With such a portable data entry terminal, persons collecting data become more productive by using such a terminal for direct input of large amounts of data while performing work tasks.

Initially, data entry terminals were cassette based to record basic inventory information on the retail or stockroom floor for subsequent transmission to computers. The next step was to miniaturize those terminals through microelectronics, making them truly portable and with large solid state memories in order to handle more complex inventory and sales entry information. Recently, terminals have been designed to enable them to be easily programmed for different applications, extending the use of a single termination to cover multiple job functions.

A conventional portable data entry terminal often includes a wand including a bar code optical reader, the wand being connected by a cord to a hand-held data entry terminal. The hand-held terminal includes the signal conditioning electronics, a microprocessor, suitable memory and a power source, such as a battery. The hand-held terminal typically includes a keyboard for entering data commands and a display for readout of data. A typical portable data entry terminal of this type, without the wand, is shown in U.S. Pat. No. D. 249,345.

It has been found that such a portable data entry terminal is somewhat limited in its applicability. While ideally suited for inventory control, sales reporting and remote field operations, such a complete portable data entry terminal is too bulky and expensive for many applications. Accordingly, it is the object of the present invention to still further expand the use of computers and to find new and useful applications therefore by providing an even greater ability to capture, contain and manage data.

In other fields, it has been proposed to reduce the size of an electronic system by placing major portions thereof in a cordless, wand-type enclosure. For example, in U.S. Pat. No. 3,826,900, an optical decoding system employs a hand-held, optical probe scanner, for optically reading coded information from merchandise labels. The hand-held unit includes a transmitter for transmitting the information to a receiver for processing. Also, in U.S. Pat. No. 4,091,270, an electronic calculator including an optical bar code reader for entering program commands, is housed within a selfcontained, cordless, wand-type enclosure. The enclosure is further provided with a display for displaying entered data and execution results. However, neither of these patented systems are suitable for use as a portable data entry and storage terminal in that neither has the necessary data storage capability.

SUMMARY OF THE INVENTION

According to the present invention, there is provided a totally self-contained, portable data entry terminal which provides increased convenience and a decrease in cost in capturing, containing and managing available bits of information. The present data entry terminal includes a totally self-contained, cordless, wand-type enclosure for housing a bar code optical reader, signal conditioning electronics, a microprocessor, a memory and a power source. Such a cordless terminal allows distributed data collection with several terminals in the hands of different users.

In a typical application, a more complex base terminal with keyboard and visual display can be adapted for receipt of multiple cordless terminals. To load data into the base terminal, a user would scan a special bar code which would instruct the cordless terminal to transmit its stored data. The cordless terminal could then be inserted into an optical-coupled interface module where the data would be transferred from the cordless terminal to the base terminal.

Another typical application for the present data entry terminal would be in the restaurant industry. Instead of using the traditional pen and pad, a waitress could scan the appropriate bar code printed on a restaurant menu to enter the menu items ordered by the patrons. After taking the patron's order, the waitress would go to a waitress station, scan a special transmission bar code, insert the terminal into an opticalcoupled interface and transmit the data to a central in-house computer. The computer would then translate the received data into prices and word descriptions, transmit the patron's order to a printer in the kitchen for the cooks to begin meal preparation, and print out the patron's bill at a printer located at the waitress station. Other applications for a self-contained, portable data entry terminal will be obvious from the foregoing description.

Briefly, the present self-contained, portable data entry terminal comprises an optical sensor, signal conditioning means responsive to the optical sensor, a microprocessor responsive to the signal conditioning means for processing input data sensed by the sensor, a memory for storing the input data and a power source. The above components are contained within a cordless, wand-type enclosure. In order to read data recorded in the memory, the processor signals the memory to conduct the data to the optical sensor which then functions as an output device. An optical interface responsive to the optical sensor may be used to transmit the data stored in the memory to peripheral devices, data transmission devices or computers.

OBJECTS, FEATURES AND ADVANTAGES

It is an object of the present invention to solve the problems associated with expanding the utility of portable data entry terminals. It is a feature of the present invention to solve these problems by the provision of a portable data entry terminal in a self-contained, cordless, wand-type enclosure. An advantage to be derived is a portable data entry terminal of increased utility. Another advantage is a portable data entry terminal which can be readily carried and used as simply as a pen. Still another advantage is a portable data entry terminal which is significantly less costly. Still another advantage is a portable data entry terminal which eliminates the necessity for a separate output device.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a perspective view of a portable data entry terminal including a cordless, wand-type enclosure constructed in accordance with the teachings of the present invention;

FIG. 2 is a circuit block diagram of the present portable data entry terminal;

FIG. 4 is a circuit diagram showing the manner in which the present data entry terminal may be interfaced with a computer;

DESCRIPTION OF THE PREFERRED EMBODIMENT

Figure 3:
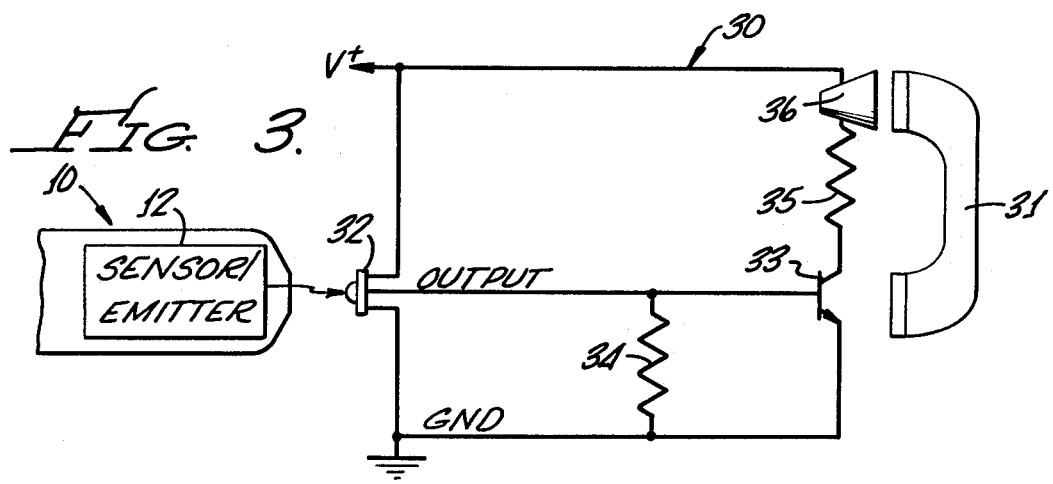
FIG. 3 is a circuit diagram showing the manner in which the present data entry terminal may be interfaced with a telephone line.

Referring now to the drawings and, more particularly, to FIG. 1 thereof, there is shown a self-contained, portable data entry terminal, generally designated 10, including a housing or enclosure 11. As will appear more fully hereinafter, terminal 10 is a small, hand-held, fully portable data collection terminal. Terminal 10 is designed for applications where low cost is a prime consideration, where user convenience is important, and where small size, light weight, environmental ruggedness, and long term reliability are requirements.

Mounted within housing 11 is a power source, typically a miniature, rechargable ni-cad battery, such that battery replacement would not be required for several years. The rear end of enclosure 11 may have a removable section for battery replacement. At the nose or tip of enclosure 11 is mounted an optical sensor 12 which functions as a bar code reader and output device, as will be explained more fully hereinafter. The nose of enclosure 11 would be constructed to permit removal from the remainder of enclosure 11 to permit replacement of the nose due to abrasion thereof by the scanned medium. Since there are no other user-servicable parts, the main body of housing 11 would be sealed together to prevent user tampering and improve environmental protection.

Referring now to FIGS. 1 and 2, there is shown an overall block diagram of the components mounted within enclosure 11. As previously mentioned, a bar code optical reader functioning as a sensor/emitter 12 is mounted in the nose of housing 11. Sensor/emitter 12 is a conventional device including a light emitting diode for data transmission and for illumination of the bar code medium and a photodiode for reception, light transmitted by the light emitting diode and reflected from a surface 13 being received by the photodiode. Bar code readers are well known to those skilled in the art, as exemplified by U.S. Pat. Nos. 3,925,639 and 4,160,156.

The output of sensor/emitter 12 is applied to signal conditioning electronics including an amplifier 14 for amplifying the analog output of sensor/emitter 12 and an analog-to-digital converter 15 for converting the output of amplifier 14 to a digital signal. The output of converter 15 would be applied to a microprocessor 16, a conventional data processing device having some form of program memory storage, i.e. either a read only memory (ROM) for non-volatile program storage or a random access memory (RAM) for programmable program storage. The output of an oscillator 17 is applied to microprocessor 16 as a clock signal. Microprocessor 16 interfaces over lines 18 with a data storage device or memory 19, such as a RAM. Microprocessor 16 controls the operation of an audio output device or beeper 20 and a visual output device or light 21, typically a light emitting diode.

Power for operating the circuit electronics is provided by a rechargable battery 22 connectable to a charger (not shown). Housing 11 would contain suitable contacts (not shown) for engagement by mating contacts when inserted into a charging unit so that battery 22 can be recharged when not in use. Battery 22 is connected by means of a pushbutton switch 23 to microprocessor 16 and the other circuit components. Battery 22 is also connected directly to memory 19 to insure data retention thereby. As shown, switch 23 is mounted in a convenient location on the surface of enclosure 11 so that switch 23 may be depressed and held by a user during use of terminal 10. Switch 23 would be of the type that must be held in order to maintain same closed so that terminal 10 is not inadvertently left on when not in use. A reset circuit 24 is connected between switch 23 and microprocessor 16 so that microprocessor 16 receives a suitable reset signal whenever switch 23 is closed.

Beeper 20 and light 21 are provided to notify the user of system operation, as will be described more fully hereinafter. Beeper 20 would typically be located at the rear of housing 11 and directionally pointed back at the user for maximum audibility. Likewise, light 21, a pulsed light emitting diode, is canted to point back at the user for maximum viewing angle visibility. Light 21 is primarily required for high ambient noise environments where the audio beeper cannot be heard.

Terminal 10 can be programmed to operate in any desired mode. The following is the presently contemplated preferred mode of operation:

The operator interfaces to terminal 10 by depressing switch 23 on housing 11. To scan correctly, the user needs to position the thumb or index finger on switch 23 only. Terminal 10 will now accept scanning by the user. At this time, operation is similar to any bar code optical reader with sensor/emitter 12 scanned across a conventional bar code. In a data input mode, the bar code is scanned left to right. Microprocessor 16 verifies the input data and if the bar code is properly scanned, microprocessor 16 stores the scanned data in memory 19. The user will then hear one of three types of beeps from beeper 20 or no beep at all.

If there is no beep, the user has not scanned the bar code properly or the bar code label has print flaws in it. The user needs to rescan the bar code label again in the forward direction. If the bar code label has been printed with voids and flaws, scanning a different cross section of the label may solve this problem. Another reason for terminal 10 not reading a label is that the user may have not scanned all of the bars or may have scanned at too fast or too slow a rate.

A very short beep (chirp) after a forward scan is used to indicate that the user has approached the end of the memory and there are only a few additional scans left to the user. The number of scans remaining will vary with the type of label that the user has been scanning. A medium length beep after a forward scan will indicate that terminal 10 has correctly read the bar code label that was scanned and that the user may scan another bar code at this time, if power switch 23 is still depressed. A long, descending pitch beep is used to indicate that terminal 10 cannot accept any more data into its memory. The user must transmit this data, if desired, and clear the memory at this time.

Terminal 10 is also preferably programmed to seek and delete specified data from memory 19. The deletion of data is achieved by scanning the bar code from right to left in a similar manner to the forward scanning just discussed. If the label has been scanned correctly, terminal 10 will first issue a medium beep to indicate that the scan was correct. Microprocessor 16 will then scan memory 19 for an identical code and delete it from the memory. A lower pitch beep will then be given to signify that the deletion was successful. If the data cannot be found, no lower pitch will be given. Light 21 will function similarly to beeper 20. Thus, the user has a clear confirmation of the operation of terminal 10.

If several data entry codes, identical to the reverse-read code, are located in memory 19, then microprocessor 16 is programmed so as to delete only the latest entered identical code during a seek and delete operation. The earlier entered identical codes will remain intact. Thus, if several codes identical to the reverse-read code are to be deleted, a reverseread seek and delete command must be initiated for each one.

It is obvious that sensor/emitter 12 may be used to provide various commands to terminal 10. There are four basic types of bar code commands:
1. Seek and delete;
2. Clear all data;
3. Identification; and
4. Transmit.

Activation of the "seek and delete" function has just been described. The remaining commands may be activated by a predetermined bar code which would be typically printed on a user available card for use when necessary.

The "clear all data" command is obviously provided to command terminal 10 to clear all data from memory 19 so as to allow the user to begin adding new data. Microprocessor 16 would typically be programmed to require two consecutive forward scans of this command code in order to initiate action. This functions as an interlock feature designed to prevent inadvertent erasure of all data.

The "identification" code may be included to identify each terminal 10 or each user. Such an identification code is non-volatile and cannot be lost due to any other data entry or command. It is not cleared when other data is cleared. The only way to modify the identification code is to enter another identification code, causing the first code to be overwritten by the second. The identification code may be entered at any time, even with memory 19 full, since it occupies a reserved location in the memory. The identification code would typically always be the first code to be transmitted during any data transmission.

A significant feature of the present invention is in the use of sensor 12 as both a sensor and an emitter to permit the read out of data stored in memory 19. That is, by scanning a predetermined bar code, microprocessor 16 may be signalled to read the data from memory 19 and to transmit such data over a line 25 back to sensor/emitter 12 to pulse the light emitting diode contained therein in accordance with the stored data. In this manner, data stored in terminal 10 may be transmitted to peripheral devices without the necessity of providing a separate output device for terminal 10.

FIG. 3 shows a typical interface system, generally designated 30, for conducting the data from terminal 10 to a telephone hand set 31. Interface system 30 includes a three terminal integrated optical sensor 32, one terminal of which is connected to a power source V+, another terminal of which is connected to circuit ground, and the output terminal of which is connected to the base of a transistor 33. The emitter of transistor 33 is connected to circuit ground and to the base thereof via a resistor 34. The collector of transistor 33 is connected via a resistor 35 and a speaker 36 to V+. Thus, the pulsed light output of sensor/emitter 12 is converted by interface system 30 to an electrical signal which is used by speaker 36 to generate an audible signal which is sensed by hand set 31 for transmission over a conventional telephone line.

FIG. 4 shows an interface system, generally designated 40, for permitting asynchronous transmisison of the data stored in memory 19 to a computer. In system 40, an integrated optical sensor 41, identical to sensor 32, is connected between V+ and ground in the same manner as in system 30, with the output and ground terminals being connected directly to a computer via lines 42 and 43, respectively.

Microprocessor 16 would conveniently be programmed with four different transmission codes:
1. Transmit once;
2. Transmit and repeat;
3. Frequency shift key (FSK); and
4. Asynchronous.

Each of these transmit commands would be initiated by a predetermined bar code pattern.

After the "transmit once" command has been entered, the next time switch 23 is depressed, terminal 10 will transmit the data stored in memory 19, as just described, and beeper 20 will generate a long beep to indicate completion of data transmission. When switch 23 is depressed again, terminal 10 will not transmit again but will wait for either a new data entry or a command code. To transmit a second time, the transmit once command must be entered a second time.

After the "transmit and repeat" command has been entered, the next time switch 23 is depressed, terminal 10 will transmit the data stored in memory 19, as just described, and beeper 20 will generate a long beep to indicate completion of data transmission. When switch 23 is depressed again, terminal 10 will again transmit the data and will retransmit the data each time switch 23 is depressed.

When switch 23 is depressed after the transmit and repeat command has been entered and sensor/emitter 12 "sees white" (e.g., terminal 10 is placed against white paper or sees a photo intensity simulating reflectance off white paper), terminal 10 will cease transmission and will wait for either a new data entry or a command code.

The "FSK" transmission command is specifically intended for use in acoustic or direct connection common carrier telephone transmissions, such as with interface system 30 shown in FIG. 3. The transmission frequencies, mark (1300 Hz) and space (2100 Hz), are generated by pulsing sensor/emitter 12 at the appropriate rate.

The "asynchronous" transmission command is specifically intended for use in direct interface connection with a host computer or peripheral, such as with interface system 40 shown in FIG. 4. In this case, the data bit stream is generated by pulsing the light emitting diode in sensor/emitter 12 at the appropriate timing interval.

Figure 5:
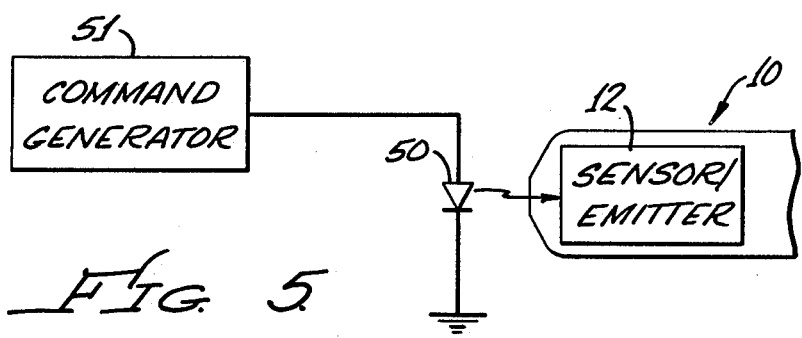
FIG. 5 is a circuit diagram showing the manner in which the present data entry terminal can receive commands from an external light emitting device.

Referring now to FIG. 5, commands to terminal 10 may also be achieved by pulsing an external light emitter 50, connected between a command generator 51 and circuit ground, emitter 50 being aimed at sensor/emitter 12. In this manner, terminal 10 can receive data, parameters, commands or operating programs through sensor/emitter 12. Thus, bidirectional data or commands can be passed between terminal 10 and other intelligent devices.

A conventional portable data entry terminal is typically a large, bulky device of the type shown in the beforementioned U.S. Pat. No. D. 249,345, containing a captive wand on a cord electrically connected to the terminal. As a result, such a terminal is suitable for use only by a single user. With the present cordless, wand-type terminal, a base terminal, such as that shown in U.S. Pat. No. D. 249,345, can be modified to incorporate an optical sensor, of the type described in connection with FIGS. 3 and 4, so that such a base terminal can be used with several terminals 10 in the hands of several users. To load data into the base terminal, a user would scan a special bar code, as described previously, to instruct terminal 10 to transmit its stored data the next time switch 23 is depressed. Terminal 10 would then be inserted into the optical-coupled interface module where the data would be transferred asynchronously from terminal 10 to the base terminal.

Figure 6:
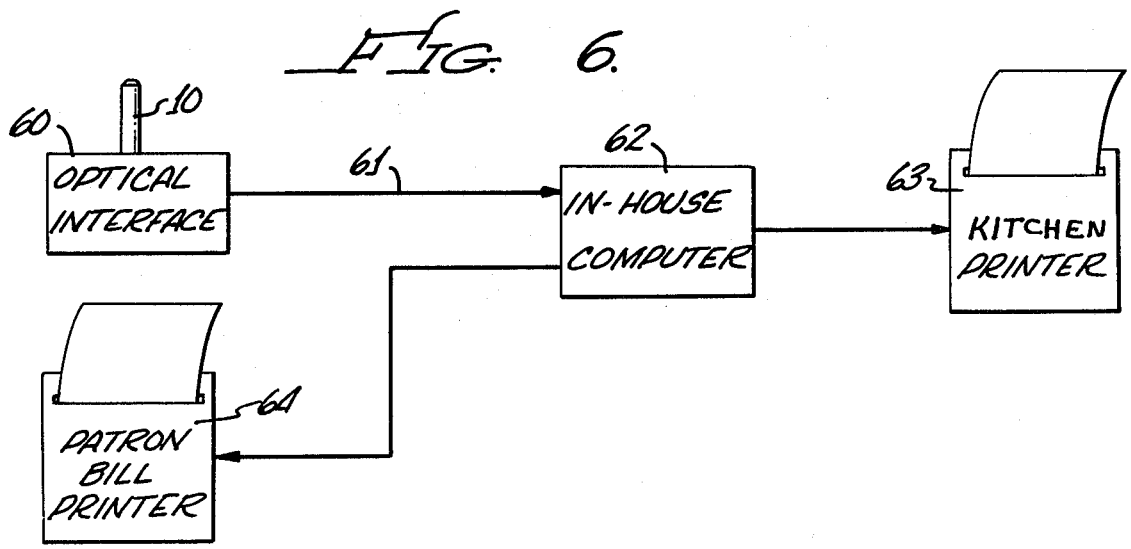
FIG. 6 is a block diagram showing a typical application for the present data entry terminal.

Another application of terminal 10 is shown diagrammatically in FIG. 6. That is, terminal 10 could conveniently be used in the restaurant industry. Instead of using the traditional pen and pad, the waitress could be provided with a restaurant menu printed with appropriate bar code information for use in entering menu items ordered by patrons. As the patrons order, the waitress would scan the appropriate bar code printed on the menu. After taking the patron's order, the waitress would step to a waitress station, scan the special transmission bar code, and insert terminal 10 into an optical-coupled interface 60 similar to interface system 40 of FIG. 4. The data would then be transmitted over a line 61 to the central in-house computer 62. Computer 62 would translate the received data into prices and word descriptions and transmit the patron's order to a printer 63 in the kitchen for the cooks to begin meal preparation. Computer 62 could also transmit the patron's order to a second printer 64 located at the waitress station for delivery to the patron at the end of the meal.

It can therefore be seen that according to the present invention, there is provided a totally self-contained, portable data entry terminal 10 which provides increased convenience and a decrease in cost in capturing, containing and managing available bits of information. Data entry terminal 10 includes a totally self-contained, cordless, wand-type enclosure 11 for housing sensor/emitter 12, signal conditioning electronics 14, 15, microprocessor 16, memory 19 and power source 22. Such a cordless terminal allows distributed data collection with several terminals in the hands of different users.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A self-contained, portable data entry terminal comprising:
    a bar code optical sensor;
    signal conditioning means responsive to said optical sensor;
    processor means responsive to said signal conditioning means for processing bar code input data sensed by said sensor;
    memory means for storing said bar code input data;
    a power source; and
    a self-contained, cordless, wand-type enclosure for housing said sensor, said signal conditioning means, said processor means, said memory means and said power source.

2. A self-contained, portable data entry terminal according to claim 1, further comprising:
    visual output means responsive to said processor means for visually signalling operation of said data entry terminal.

3. A self-contained, portable data entry terminal according to claim 1 or 2, wherein said sensor is a sensor/emitter and further comprising:
    means for conducting said input data stored in said memory means to said optical sensor/emitter.

4. A self-contained, portable data entry terminal according to claim 3, wherein said conducting means includes said microprocessor for reading the input data stored in said memory means and conducting said data to said optical sensor/emitter.

5. A self-contained, portable data entry terminal according to claim 3, wherein said input data pulses said optical sensor/emitter to provide an optical output indicative of said stored input data.

* * * * *

REEXAMINATION CERTIFICATE (1111th)
United States Patent [19]
Culp

[11] B1 4,471,218
[45] Certificate Issued Aug. 1, 1989

[54] SELF-CONTAINED, PORTABLE DATA ENTRY TERMINAL

[75] Inventor: David W. Culp, Huntington Beach, Calif.

[73] Assignee: MSI Data Corporation, Costa Mesa, Calif.

Reexamination Request:
No. 90/001,322, Sep. 3, 1987

Reexamination Certificate for:
Patent No.: 4,471,218
Issued: Sep. 11, 1984
Appl. No.: 379,929
Filed: May 19, 1982

[51] Int. Cl.⁴ ............................................. G06K 7/10

[52] U.S. Cl. ................................. 235/472; 235/462; 235/454

[58] Field of Search .................................... 235/472

[56] References Cited
FOREIGN PATENT DOCUMENTS
2338773 2/1975 Fed. Rep. of Germany.

*Primary Examiner*—David L. Trafton

[57] ABSTRACT

A self-contained, portable data entry terminal positioned within a cordless, wand-type enclosure. Positioned within the enclosure is a bar code optical sensor/emitter, signal conditioning electronics, a microprocessor, a memory, and a rechargable battery. The bar code optical reader functions as both a sensor and an emitter to permit the readout of data stored in the memory.

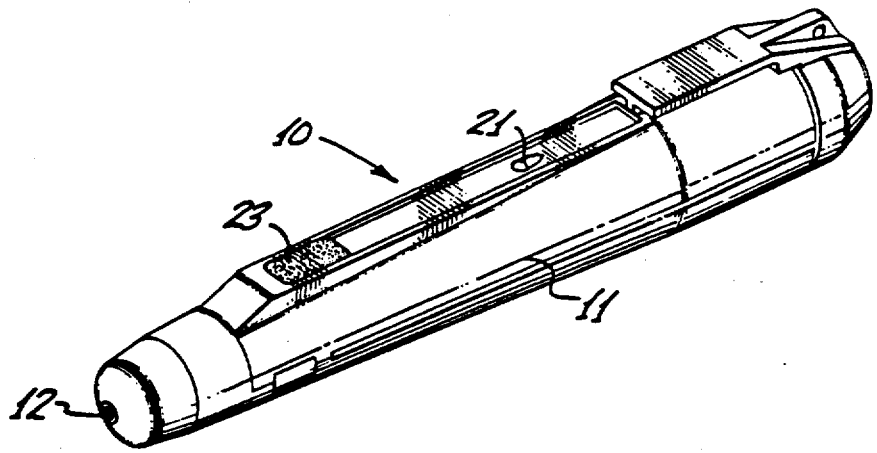

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-5 are cancelled.

* * * * *